United States Patent [19]
Pahk et al.

[11] Patent Number: 5,841,668
[45] Date of Patent: Nov. 24, 1998

[54] METHOD OF ASSESSING THREE DIMENSIONAL VOLUMETRIC ERRORS IN MULTIAXIS MACHINE TOOLS

[75] Inventors: Heui Jae Pahk; Joon Hee Moon; Chong Nam Chu, all of Seoul, Rep. of Korea

[73] Assignee: Snu Precision Co., Ltd., Seoul, Rep. of Korea

[21] Appl. No.: 866,050

[22] Filed: May 30, 1997

[30] Foreign Application Priority Data

Nov. 29, 1996 [KR] Rep. of Korea .................. 1996-59263

[51] Int. Cl.$^6$ .................................................. B23Q 15/18
[52] U.S. Cl. ............... 364/551.01; 702/182; 364/474.02; 73/37.9; 33/503
[58] Field of Search .......................... 364/551.02, 474.01, 364/474.12, 474.18, 474.24, 474.35, 571.02, 176, 183; 73/1.79, 37.9; 33/502, 503, 553

[56] References Cited

U.S. PATENT DOCUMENTS

| 5,257,460 | 11/1993 | McMurtry | .................................. 33/502 |
| 5,691,904 | 11/1997 | Lysen | ......................................... 33/503 |
| 5,726,896 | 3/1998 | Jia et al. | ............................. 364/474.29 |

OTHER PUBLICATIONS

Abstract by Pahk et al.; "New technique for volumetric error assessment of CNC machine tools incorporating ball bar measurement and eD volumetric error model"; International Journal of Machine Tools and Manufacture vol. 37, n11, Nov. 1997.

"A Simple Method For Testing Measuring Machines and Machine Tools" by J.B. Bryan (Precision Engineering, vol. 4(2), 1982).

"Test of the Three–Dimensional Uncertainty of Machine Tools and Measuring Machines and its Relation to the Machine Errors" by Knapp, W. (Annals of CIRP, vol. 32(1), pp. 459–464 No Date.

"On Testing Coordinate Measuring Machines (CMM) with Kinematic Reference Standards (KRS)" by Kunzmann H., et al. (Annals of CIRP, vol. 32(1), pp. 465–468, 1983.

"The Measurement of Motion Errors of NC Machine Tools and Diagnosis of Their Origins by Using Telescoping Magnetic ball bar Method" by Kakino, Y., et al. (Annals of CIRP, vol. 36(1), pp. 377–380, 1987).

*Primary Examiner*—James P. Trammell
*Assistant Examiner*—Shah Damini
*Attorney, Agent, or Firm*—Lowe Hauptman Gopstein Gilman & Berner

[57] ABSTRACT

A method of assessing three-dimensional volumetric errors of multiaxis machine tools in three-dimensional working space is disclosed. Each three-dimensional volumetric error component can be systematically measured and analyzed on the modeling of polynominal functions in accordance with the volumetric errors and the kinematic chain in accordence with the corresponding machine tool. The method inputs the measured radial data performed on the three orthogonal planes, analyzing the parametric errors such as positional, straightness, angular, squareness, and backlash errors. The positional error components along each of three orthogonal axes are modeled as a dimensionless polynominal function with corresponding positional error coefficients. The method also can assess dynamic performance of the machine tools such errors due to the servo gain mismatch. The method employs the kinematic ball bar to assess the volumetric errors.

8 Claims, 10 Drawing Sheets

FIG. 6A
XY PLANE

FIG. 6B
YZ PLANE

FIG. 6C
ZX PLANE (SCALE: 15μm/DIVISION)

FIG. 7A
XY PLANE

FIG. 7B
YZ PLANE

FIG. 7C
ZX PLANE (SCALE: 15μm/DIVISION)

FIG. 8A  POSITIONAL ERROR

| X positional error = 8.4μm |
| Y positional error = 13.4μm |
| Z positional error = 11.0μm |

FIG. 8B  STRAIGTNESS ERROR

| Y straightness error along Xaxis = 2.5μm |
| Z straightness error along Xaxis = 2.7μm |
| X straightness error along Yaxis = 2.6μm |
| Z straightness error along Yaxis = −0.6μm |
| X straightness error along Zaxis = 1.5μm |
| Y straightness error along Zaxis = 0.5μm |

FIG. 8C    ANGULAR ERROR

| Y angular error along X axis = −36.8μrad |
|---|
| Z angular error along X axis = 33.6μrad |
| X angular error along Y axis = −9.1μrad |
| Z angular error along Y axis = −34.8μrad |
| X angular error along Z axis = −7.8μrad |
| Y angular error along Z axis = 20.3μrad |

FIG. 8D    SQUARENESS ERROR

| Squareness error between XY axis = 20.9μrad |
|---|
| Squareness error between YZ axis = 133μrad |
| Squareness error between ZX axis = −88.9μrad |

FIG. 8E    BACKLASH ERROR

| | |
|---|---|
| Backlash error in X axis = | 3.8μm |
| Backlash error in Y axis = | 2.7μm |
| Backlash error in Z axis = | 3.2μm |

FIG. 8F    SERVO GAIN MISMATCH ERROR

| |
|---|
| Error due to servo gain mismatch between XY axis = 8.1μm |
| Error due to servo gain mismatch between YZ axis = −2.0μm |
| Error due to servo gain mismatch between ZX axis = 3.7μm |

( MEASUREMENT RANGE: 150mm )

METHOD OF ASSESSING THREE DIMENSIONAL VOLUMETRIC ERRORS IN MULTIAXIS MACHINE TOOLS

FIELD OF THE INVENTION

The present invention relates to multiaxis machine tools, and more particularly to a method of assessing three-dimensional volumetric errors in the multiaxis machine tools to measure each component of static and dynamic errors which have influence on precision of the multiaxis machine tools with mutiple freedoms, for example, computer numerical control(hereinafter referred to as "CNC") machine tools, and three-dimensional coordiate measuring machines, etc. and to analyze the error components and to assss the three-dimensional volumetric errors.

Recently, development of efficient techniques for performance verification of the multiaxis machine tools has been considered as an important task for accuracy enhancement and quality assurance for users and manufactures of the CNC machine tools and the coordiate measuring machines. In order to perform precise position control and to promote accuracy of the multiaxis machine tools, the development of efficient techniques is directed to assessment of the three-dimensional volumetric errors, since it is very essential to measure and analyze each error component and to assess the three-dimensional volumetric errors.

Figure 1:
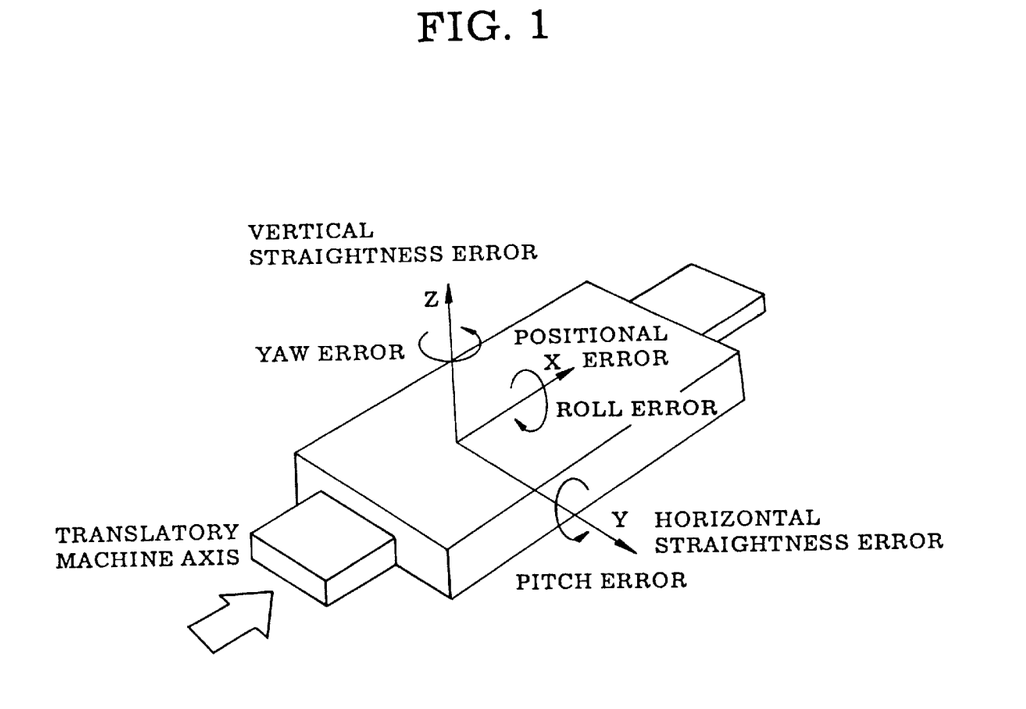
FIG. 1 is a schematic view explaining six geometric error components when a machine element moves along a guideway.

The static errors include geometric errors, kinematic errors, and thermal errors, etc. and the dynamic errors include errors due to servo gain mismatch and dynamic characteristics. FIG. 1 shows the geometric errors referred to as positional error, horizontal straightness error, vertical straightness error, roll error, pitch error, and yaw error.

On the other hand, a number of attempts have been made and various techniques have been developed to assess the performance checking of the machine tools. In order to assess the performance checking of the machine tools, double ball bar or kinematic ball bar has been frequently used.

Considering known prior arts, a method is described in a paper by Bryan, J. entitled "A simple method for testing measuring machines and machine tools" (Precision Engineering, Vol.4(2), 1982). The method employs a ball bar consisting of precision balls and linear variable differential transducer(hereinafter referred to as "LVDT") for checking accuracy of machine tools. A similar method using a two-dimensional probe and a master disc is disclosed in "Test of three-dimensional uncertainty of machine tools and measuring machines and its relation to machine errors" by Knapp, W. (Annals of CIRP, Vol. 32(1), pp. 459–464, 1983). Another article which is relevant for a kinematic ball bar for the parametric error calibration of the machine tools, is entitled "On testing coordinate measuring machines with kinematic reference standards" by Kunzmann, H., et al. (Annals of CIRP, Vol. 32(1), pp. 465–468, 1983). Further another article which is relevant for the relationship between the ball bar measurement and the various parametric errors for machines, is entitled "The measurement of motion errors of NC machine tools and diagnosis of their origins by using telescoping magnetic ball bar method" by Kakino, Y., et al. (Annals of CIRP, Vol. 36(1), pp. 377–380, 1987).

However, the aforedescribed known prior arts have the severe drawbacks and problems that the error assessment of the multiaxis machine tools is performed in two-dimensional work space and the only overall error amounts are measured but each error component, which is involved in the overall error amounts, can not be analyzed. Accordingly, error compensation has to be repeatedly carried out by trial and error, and moreover the error may not be accurately compensated on account of the dependence on the overall error amounts.

SUMMARY OF THE INVENTION

The present invention is directed to overcome the drawbacks and problems as set forth above.

It is an object of the present invention to provide a method of assessing three-dimensional volumetric errors of a multiaxis machine tool in 3-dimensional working space wherein each three-dimensional error component can be systematically measured and analyzed on the basis of the modeling of polynominal functions in accordance with the corresponding volumetric errors and the kinematic chain of the corresponding machine tool.

It is another object of the present invention to provide a method of assessing three-dimensional volumetric errors of a multiaxis machine tool in 3-dimensional working space wherein the analyzed error components can be accurately and efficiently compensated.

It is futher object of the present invention to provide a method of assessing three-dimensional volumetric errors of a multiaxis machine tool in 3-dimensional working space wherein a computer aided analysis system can be adapted for the calculation and the compensation of the parametric error components, based on the circular measurement using the kinematic ball bar.

According to the present invention, these objects are achieved. There is provided a method comprising setting up a first radial error equation in accordance to error in distance between commanded nominal coordinates of a spindle of a multiaxis machine tool and actually moved coordinates of the spindle with respect to a fixed center point to measure the volumetric errors of the muiltiaxis machine tool in three-dimensional working space; modeling first positional error components along each of three orthogonal axes as a dimensionless polynominal function with corresponding positional error coefficients; modeling second positional error components due to backlach along each of the three axes with corresponding amount of the backlash in the three axes; modeling third positional error components along each of the three axes with corresponding amount of squareness errors between two nominally orthogonal axes among the three axes; setting up three-dimensional volumetric error equation depending on kinematic configuration of the multiaxis machine tool; setting up a second radial error equation by substituting the three-dimensional volumetric error equation, the first positional error components, the second positional error components, and the third positional error components for the first radial error eqation; solving the second radial error eqation and calculating the positional error coefficients, the amounts of the backlash, and the amounts of squareness by means of an approximation method and coordinates data.

Perferrably, the method according to the present invention further includes modeling straightness error components along each of the three orthogonal axes as a dimensionless polynominal function with second order terms and corresponding straightness error coefficients, modeling roll error components along each of the three orthogonal axes as a dimensionless polynominal function with corresponding roll error coefficients, modeling pitch and yaw error components as each derivative of the straightness error components, and modeling error components due to servo gain mismatch along each of the three orthogonal axes with each servo gain and velocity of each axis.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which the preferred embodiments of the invention are illustrated.

DETAILED DESCRIPTION OF THE PREFERRED EMBODIMENT

This invention will be described in further detail by way of embodiment with reference to the accomanying drawings.

In the embodiment according to the present invention, measurement apparatus employs a kinematic ball bar which is operatively connected to a CNC machine tool as a multiaxis machine tool. The kinematic ball bar may be substituted by a master disk, a master cylinder, or a master ball and the CNC machine tool may be substituted by a three-dimensional coordinate measuring machine.

Figure 2:
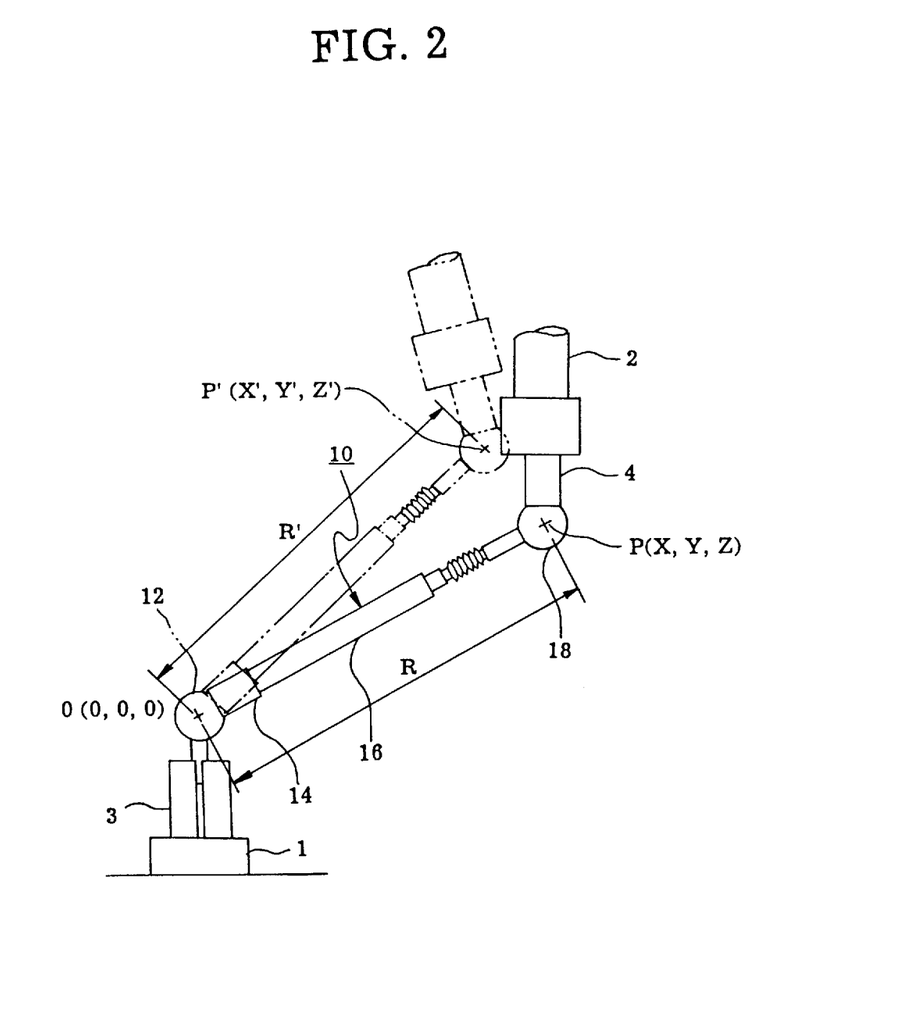
FIG. 2 is a schematic front view showing an error measurement apparatus using a kinematic ball bar which is employed to perform the method according to the present inventon.

Referring to FIG. 2, FIG. 2 shows a typical setup for an error measurement apparatus using a kinematic ball bar 10. The kinematic ball bar 10 which enables performance checking of the machine tool to be assessed with high precision and high efficiency has been frequently used. A ball bar 16 which has precision LVDTs therein is provided with two balls 12 and 18 at both ends thereof. The ball 12 is fixed to a socket 3 which is fixedly located on a magnetic center mount 1, and the ball 18 is attached to a magnetic tool cup 4 which is fixedly located on a spindle 2 of the machine tool. The present embodiment uses a commercially available kinematic ball bar with 150 mm nominal length for circular error measurement.

In FIG. 1, let O(0,0,0) be the center point of the ball 12 on the magnetic center mount 1, and let P(X,Y,Z) which is shown in solid line be nominal coordinates of the center point of the ball 18 attached to the spindle 2. When the machine tool is commanded to move to P(X,Y,Z) position, the actual position of the machine tool is assumed P'(X',Y',Z') which is shown in alternate long and two short dashes line. Thus, the machine geometric error can be defined as the differerce R'−R between the two coordinates, P'(X',Y',Z') and P(X,Y,Z). That is, $\Delta X = X' - X$ $\Delta Y = Y' - Y$ $\Delta Z = Z' - Z$ $$C = (\Delta X, \Delta Y, \Delta Z) \qquad (1)$$

where $\Delta X$, $\Delta Y$, $\Delta Z$ are the X,Y,Z error components at the nominal position P(X,Y,Z) with respect to the O(0,0,0), and C is error vector. When the error components $\Delta X$, $\Delta Y$, $\Delta Z$ are present, the error in the distance between the two points, $\Delta R$ can be evaluated as, $$(R + \Delta R)^2 = X'^2 + Y'^2 + Z'^2 = (X + \Delta X)^2 + (Y + \Delta Y)^2 + (Z + \Delta Z)^2 \qquad (2)$$

where R is the nominal distance between the two points, O and P. When ignoring the second order terms of error components, and remembering the $R^2 = X^2 + Y^2 + Z^2$, then eq. (2) gives $$\Delta R = (X \Delta X + Y \Delta Y + Z \Delta Z)/R \qquad (3)$$

Figure 3:
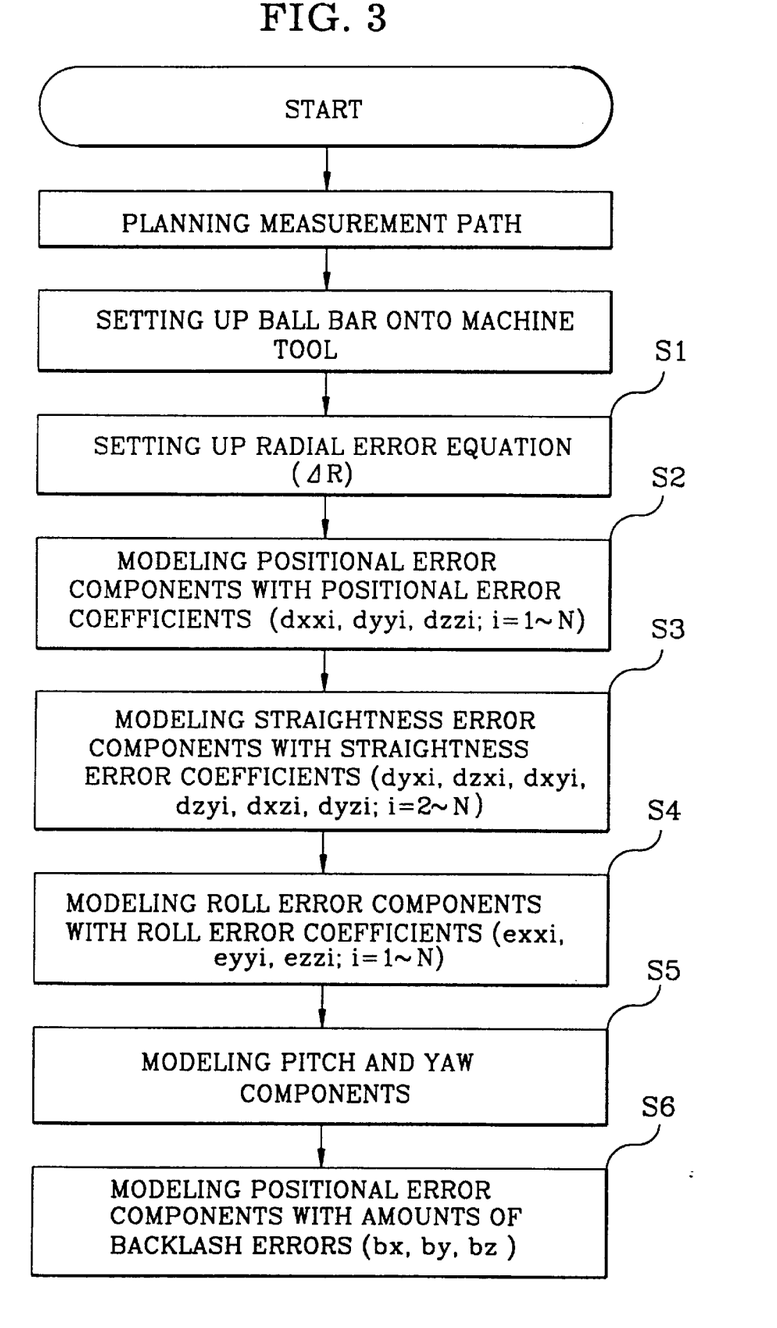
FIGS. 3 and 3A are a flow chart illustrating main steps of the method according to the present inventon.
Figure 3A:
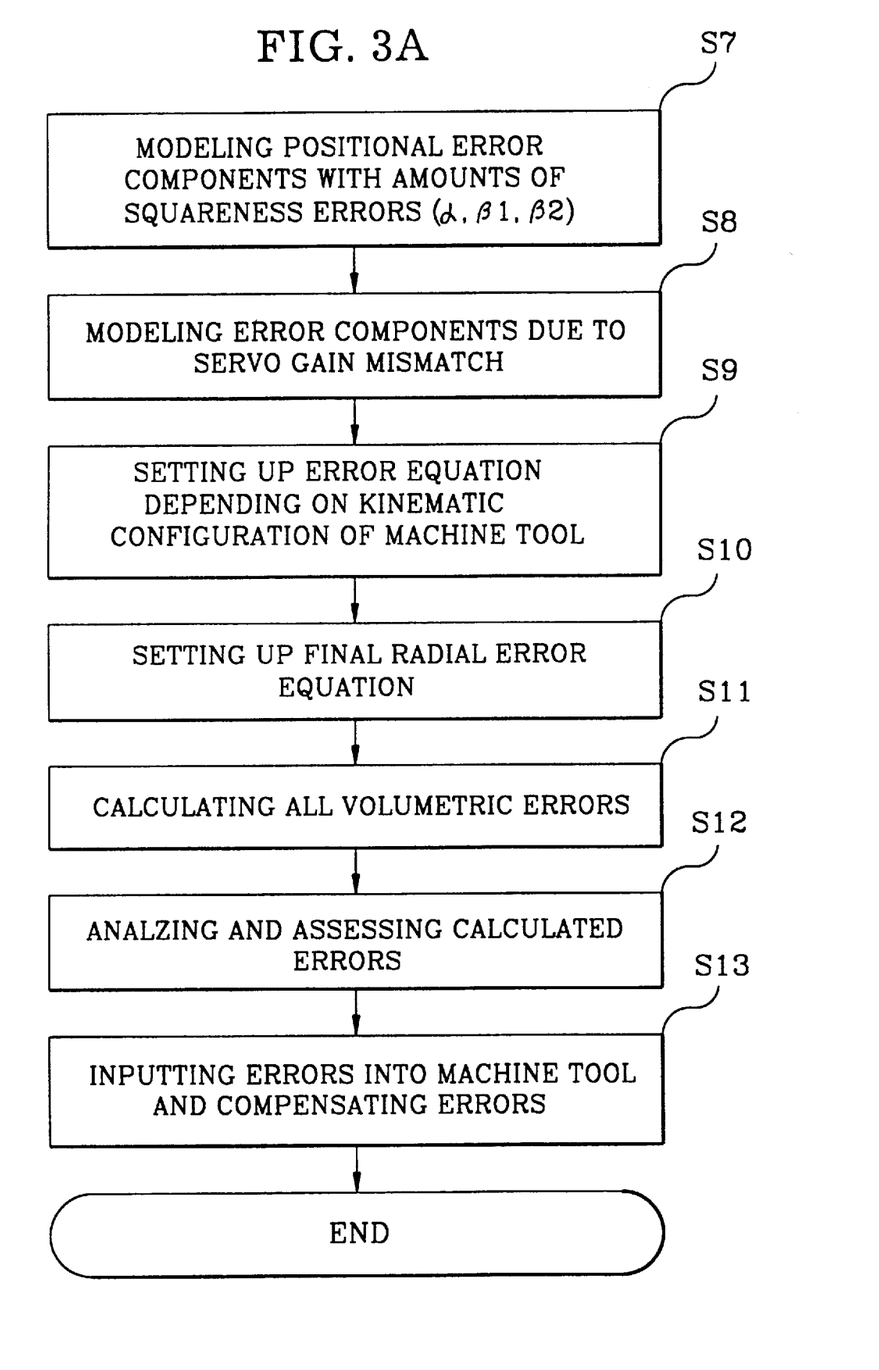

Eq.(3) gives the error in the length direction of the ball bar when the error components ($\Delta X$, $\Delta Y$, $\Delta Z$) are present during the machine movement from O point to P point, and it can be used for the error diagnosis of the machine tool. This step corresponds to step S1 in FIG. 3.

Now, parametric errors including positional errors, straightness errors, rotational errors, squareness errors, and servo gain mismatch errors are modeled for the machine tool. Prior to modeling parametric errors, translational errors $\delta$ xi(Xj) are defined as errors in the xi direction along the Xj axis and rotational errors Exi(Xj) are defined as errors in xi direction along the Xj axis.

Firstly, each of positional error components is modeled as a dimensionless polynominal function of position along each X,Y,Z axis in step S2. The positional error components, $\delta$ x(X), $\delta$ y(Y), $\delta$ z(Z) along X,Y,Z axis, which are mainly due to scale errors, lead screw pitch errors. The positional error components are usually defined as the difference between the actual coordinates and the nominal coordinates along the X,Y,Z axis, and are given as $\delta x(X) = dxx1(X/R) + dxx2(X/R)^2 + \ldots = \Sigma\ dxxi(X/R)^i$ $\delta y(Y) = dyy1(Y/R) + dyy2(Y/R)^2 + \ldots = \Sigma\ dyyi(Y/R)^i$ $$\delta z(Z) = dzz1(Z/R) + dzz2(Z/R)^2 + \ldots = \Sigma\ dzzi(Z/R)^i \qquad (4)$$

where X/R, Y/R, Z/R are the dimensioness coordinates of position along each axis, and dxxi, dyyi, dzzi are coefficients, and i=1~N.

Next, each of straightness error components is modeled as a dimensionless polynominal function of position beginning with second order terms in step S3. The straightness error is mainly due to nonstraightness of the guideway and due to bearing interfaces in the machine tool. The straightness error components are defined as perpendicular deviation along each axis, and are given as $\delta y(X) = dyx2(X/R)^2 + dyx3(X/R)^3 + \ldots = \Sigma\ dyxi(X/R)^i$ $\delta z(X) = dzz2(X/R)^2 + dzx3(X/R)^3 + \ldots = \Sigma\ dzxi(X/R)^i$ $$\delta x(Y) = dxy2(Y/R)^2 + dxy3(Y/R)^3 + \ldots = \Sigma\, dxyi(Y/R)^i$$

$$\delta z(Y) = dzy2(Y/R)^2 + dzy3(Y/R)^3 + \ldots = \Sigma\, dzyi(Y/R)^i$$

$$\delta x(Z) = dxz2(Z/R)^2 + dxz3(Z/R)^3 + \ldots = \Sigma\, dxzi(Z/R)^i$$

$$\delta y(Z) = dyz2(Z/R)^2 + dyz3(Z/R)^3 + \ldots = \Sigma\, dyzi(Z/R)^i \quad (5)$$

where $\delta y(X)$, $\delta z(X)$; $\delta x(Y)$, $\delta z(Y)$; $\delta x(Z)$, $\delta y(Z)$ are the straightness error components along X, Y, and Z axis, respectively. Constants dyxi, dzxi, dxyi, dzyi, dxzi, dyzi are the coefficients of the polynominal function to be determined, and i=2~N.

Next, each of roll error components is modeled as a dimensionless polynominal function of position along each X,Y,Z axis in step S4. The roll error components Ex(X), Ey(Y), Ez(Z) are defined as angular error in the axial direction and are given as $$Ex(X) = exx1(X/R) + exx2(X/R)^2 + \ldots = \Sigma\, exxi(X/R)^i$$

$$Ey(Y) = eyy1(Y/R) + eyy2(Y/R)^2 + \ldots = \Sigma\, eyyi(Y/R)^i$$

$$Ez(Z) = ezz1(Z/R) + ezz2(Z/R)^2 + \ldots = \Sigma\, ezzi(Z/R)^i \quad (6)$$

where exxi, eyyi, ezzi are the coefficients for the polynominal model, and i=1~N.

Next, each of pitch and yaw error components is modeled as each derivative of the corresponding straightness error profiles in step S5. The pitch and yaw errors are the angular error components in the perpendicular direction along each axis, and are influenced by the guideway geometry and the bearing interfaces of the machine. Accordingly, the pitch and yaw error components are given as $$Ex(Y) = \partial(\delta z(Y))/\partial Y \quad (7)$$
$$= \{2dzy2(Y/R) + 3dzy3(Y/R)^2 + \ldots\}/R = \Sigma i \times dzyi(Y/R)^{i-1}/R$$

$$Ez(Y) = -\partial(\delta x(Y))/\partial Y$$
$$= -\{2dxy2(Y/R) + 3dxy3(Y/R)^2 + \ldots\}/R = -\Sigma i \times dxyi(Y/R)^{i-1}/R$$

$$Ez(X) = -\partial(\delta z(X))/\partial X$$
$$= \{2dzx2(X/R) + 3dzx3(X/R)^2 + \ldots\}/R = -\Sigma i \times dzxi(X/R)^{i-1}/R$$

$$Ez(X) = \partial(\delta y(X))/X$$
$$= \{2dyx2(X/R) + 3dyx3(X/R)^2 + \ldots\}/R = \Sigma i \times dyxi(X/R)^{i-1}/R$$

$$Ex(Z) = -\partial(\delta y(Z))/\partial Z$$
$$= -\{2dyz2(Z/R) + 3dyz3(Z/R)^2 + \ldots\}/R = \Sigma i \times dyzi(Z/R)^{i-1}/R$$

$$Ey(Z) = \partial(\delta x(Z))/\partial Z$$
$$= \{2dxz2(Z/R) + 3dxz3(Z/R)^2 + \ldots\}/R = \Sigma i \times dxzi(Z/R)^{i-1}/R$$

where i=2~N.

Next, backlash errors are modeled in step S6. The backlash error, or reversal error, is mainly caused by the backlash in the screw/gear assembly during the motion reversal. When each amount of backlash in the X, Y, Z axis is bx, by, bz, the errors in the X, Y, Z axis due to the backlash can be modeled as $$\delta x(X) = -bx/2 \times \text{sign}(dX/dt)$$

$$\delta y(Y) = -by/2 \times \text{sign}(dY/dt)$$

$$\delta z(Z) = -bz/2 \times \text{sign}(dZ/dt) \quad (8)$$

where sign( ) is the sign function returning the sign of the terms inside the bracket, and dX/dt, dY/dt, dZ/dt are time derivatives of position in the X, Y, Z, which are velocities.

The minus sign in eq.(8) is to give the positive backlash when the motion is changed from the toward direction to the reverse direction.

Next, squareness errors are modeled in step S7. The squareness error is defined as the out of squareness between the two nominally orthogonal axes, and is mainly due to the misalignment, or misassembly in the orthogonal axes. Letting $\alpha$ be the amount of nonsquareness error of X axis from the nominal X axis (in XY plane) at the position of distance R from the origin point O, $\beta$ 1 be the amount of nonsquareness error of Z axis at the R location (in XZ plane), and $\beta$ 2 be the amount of nonsquareness error of Z axis from the nominal Z axis at R location in the XY plane, the squareness errors are as follows, $$\Delta Y = -\alpha\,(X/R)$$
$$\Delta X = -\beta\,1(Z/R)$$
$$\Delta Y = -\beta\,2(Z/R) \quad (9)$$

Next, errors due to servo gain mismatch are modeled in step S8. When the amplifier gains of the servo drives for the axis motion are not properly matched, there exists a kind of steady state following errors. When Ksx, Vx; Ksy, Vy; Ksz, Vz are the servo gains and velocities of the X, Y, Z axis, the steady state following errors, $\Delta X$, $\Delta Y$, $\Delta Z$ between the actual positions and the command positions in the X, Y, Z axis can be obtained from the control theory as $$\Delta X = Vx/K_{sx}$$
$$\Delta Y = Vy/K_{sy}$$
$$\Delta Z = Vz/K_{sz} \quad (10)$$

On the other hand, when F is the circumferential feed velocity, Vx, Vy can be obtained as $$Vx = -F\sin\theta,\ Vy = F\cos\theta \text{ for counter clockwise rotation} \quad (11)'$$

$$Vx = F\sin\theta,\ Vy = -F\cos\theta \text{ for clockwise rotation} \quad (11)''$$

where $\theta$ is angular position along the circular motion.

Applying eqs.(11)', and (11)'' to eq.(10), then substituting into eq.(3), $$\begin{aligned}
\Delta R &= -F\sin\theta(X/R)/Ksx + F\cos\theta(Y/R)/Ksy \quad (12\text{-}1)\\
&= -F\sin\theta\cos\theta/Ksx + F\sin\theta\cos\theta/Ksy\\
&= (-F\,Ksy + F\,Ksx)/(Ksx\,Ksy)\cos\theta\sin\theta\\
&= eF/K_s \cos\theta\sin\theta\\
&= eF/K_s\,(X/R)\,(Y/R)\\
&= mxy(X/R)\,(Y/R) \text{ for counter clockwise rotation}
\end{aligned}$$

where $K_s = \sqrt{K_{SX} \times K_{SY}}$, $e = (K_{SY} - K_{SX})/K_s$, mxy ($= eF/K_s$) is the coefficient for the gain mismatch between X-Y axis. Similar equation can be derived for the clockwise rotation, that is, $$\Delta R = -mxy(X/R)(Y/R) \text{ for counter clockwise rotation} \quad (12\text{-}2)$$

Eqs.(12-1) and (12-2) represent the circular error which is influenced by the gain mismatch. Similarly, the circular errors due to the gain mismatch between the Y-Z axis and Z-X axis are $$\Delta R = \pm myz(Y/R)(Z/R) \quad (12\text{-}3)$$

for counter clockwise and clockwise rotation and $$\Delta R = \pm mzx(Z/R)(X/R) \quad (12\text{-}4)$$

for counter clockwise and clockwise rotation where myz, mzx are the coefficients for the gain mismatch between Y-Z axis and Z-X axis, respectively.

Figure 4:
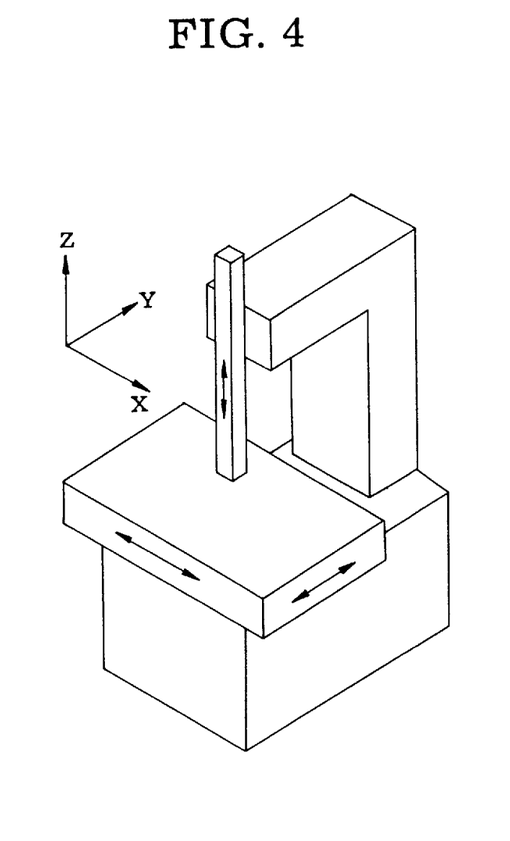
FIG. 4 is a persepective view showing schematically a column type machining center to which the method according to the present inventon is applied.

In next step S9, volumetric error equations are derived by the kinematic chain of each machine element to perform appropriate error diagnosis. The volumetric error equations are dependent on the kinematic configuration of the machine tool. In this embodiment, a column type machining center is considered as shown in FIG. 4. For the column type machining center, the volumetric error equations are given as $$\Delta X = \delta x(X) - \delta x(Y) + \delta x(Z) + Z\{-Ey(Y) - \beta 1 - Ey(X)\} + Y\{Ez(Y) + Ez(X)\} + Yp\{Ez(X) + Ez(Y) - Ez(Z)\} + Zp\{-Ey(X) - Ey(Y) + Ey(Z)\}$$

$$\Delta Y = -\delta y(X) + \delta y(Y) + \delta y(Z) + X\{-Ez(X) + \alpha\} + Z\{Ex(X) + Ex(Y) - \beta 2\} + Xp\{-Ez(X) - Ez(Y) + Ez(Z)\} + Zp\{Ex(X) + Ex(Y) - Ex(Z)\}$$

$$\Delta Z = -\delta z(X) - \delta z(Y) + \delta z(Z) + XEy(X) + Y\{-Ex(X) - Ex(Y)\} + Xp\{Ey(X) + Ey(Y) - Ey(Z)\} + Yp\{-Ex(X) - Ex(Y) + Ex(Z)\} \quad (13)$$

where Xp,Yp,Zp are the coordinates of the tool offset.

Next, final circular error equation is derived in step S10. The circular error equation can be obtained by applying eq.(13) and all error components eq.(4) to (12-4) as modeled above to eq.(3), and the circular error of the ball bar measurement is, $$\Delta R = (X\Delta X + Y\Delta Y + Z\Delta Z)/R = \Delta X(X/R) + \Delta Y(Y/R) + \Delta Z(Z/R) = \quad (14)$$

$$dxx1(X/R)^2 + dyy1(Y/R)^2 + dzz1(Z/R)^2$$

$$-3dxy2(X/R)(Y/R)^2 + dxz2(X/R)(Z/R)^2 - dyx2(Y/R)(X/R)^2 +$$

$$dyz2(Y/R)(Z/R)^2 + dzx2(Z/R)(X/R)^2 + dzy2(Z/R)(Y/R)^2$$

$$-bx/2 \times (X/R)\text{sign}(dX/dt) - by/2 \times (Y/R)\text{sign}(dY/dt) - bz/2 \times$$

$$(Z/R)\text{sign}(dZ/dt) - \beta 1(Z/R)(X/R) + \alpha(X/R)(Y/R) - \beta 2(Y/R)(Z/R) +$$

$$mxy(X/R)(Y/R)Dir + myz(Y/R)(Z/R)Dir + mzx(Z/R)(X/R)Dir$$

where Dir is a function returning plus for clockwise rotation or minus for counter clockwise rotation depending the rotation of the kinematic ball bar. The first terms of the polynominal functions are considered for each parametric error component for the efficiency of calculation, and the roll error components and the effects of the tool offsets are not considered for the simplicity of modeling.

Next, each amount of the errors which are involved in eq.(14) is calculated with the pre-measured data in step S11. In order to effectively classify and analyze the error components from the ball bar measurement data, preferably, the least squares technique is effectively applied since output signals simultaneously involve various errors which are not independent each other.

When $\Delta Rm$ is the circular error to be modeled, eq.(14) can be expressed as the linear combination of polynominal functions.

$$\Delta Rm = \Sigma A_i \times F_i \quad (15)$$

where Fi is the ith function of error modeling, and Ai is the coefficient of the ith function, and i=1~m, m is the number of the considered error factors.

Let E the sum of squares of deviation between $\Delta R$ and $\Delta Rm$, then $$E = \Sigma (\Delta R - \Delta Rm)^2 \quad (16)$$

Applying the variational principle to eq.(16) for minimizing E, $$\partial E/\partial Ai = 0 = 2\Sigma(\Delta R - \Delta Rm)\partial(\Delta Rm)/Ai \quad (17)$$

From eq.(15), $\partial (\Delta Rm)/Ai = Fi$, thus eq.(17) becomes $$\Sigma \Delta RmFi = \Sigma \Delta RFi \quad (18)$$

If we set $f = \{F1, F2, \ldots Fn\}^T$, $a = \{A1, A2, \ldots An\}^T$, then eq.(18) becomes $$(f f^T)a = (\Delta R f) \quad (19)$$

That is, $$Ca = d \quad (20)$$

where C is the square matrix (f $f^T$), and d is the column vector ($\Delta R$ f).

Eq.(20) is a typical linear equation for unknown matrix, and therefore it can be solved by applying numerical methods such as Gauss elimination method, etc.

From now on, the measurement path will be described briefly.

Figure 5A:
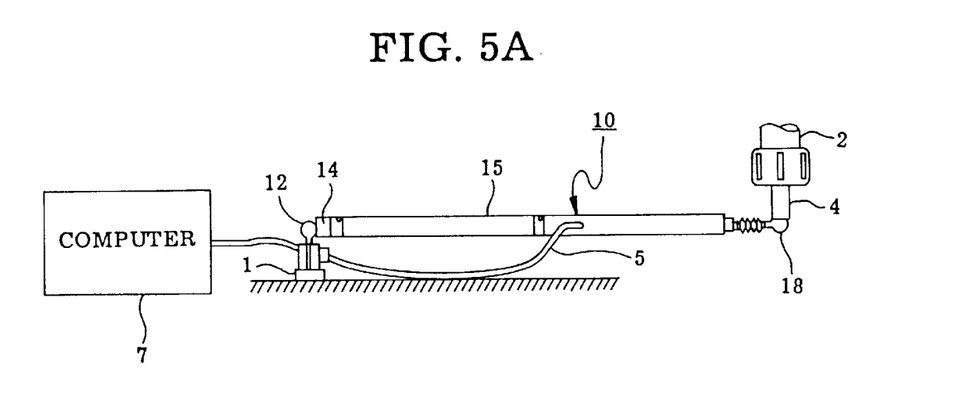
FIG. 5A is a view showing a set up of the kinematic ball bar to calibrate a 360° arc in XY plane.
Figure 5B:
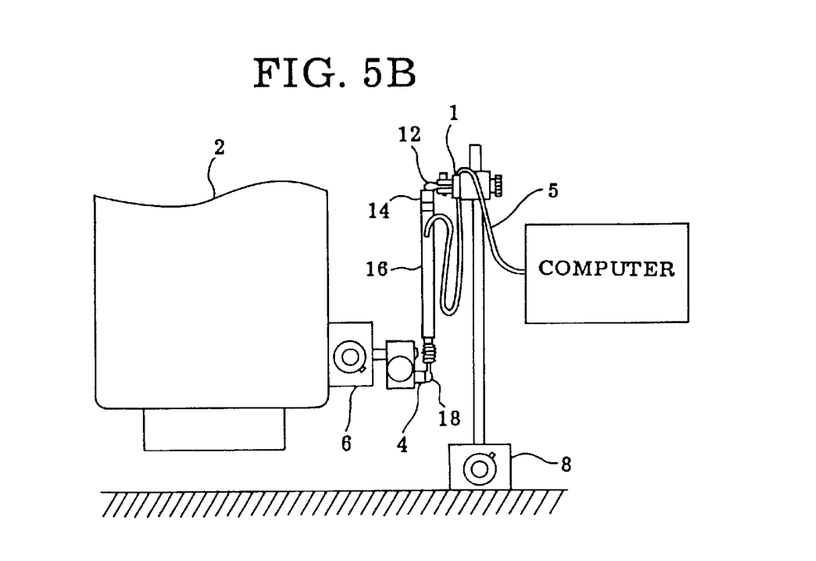
FIG. 5B is a view showing a set up of the kinematic ball bar to calibrate a 360° arc in YZ and ZX planes.

The measurement path must be planned in advance to synthetically analyze the dimensional parametric errors of the machine tool in the volumetric sense using the ball bar measurment. The method according to the present invention employs three orthogonal two-dimensional planes as the measurement path. Referring to FIG. 5A and FIG. 5B, FIG. 5A shows a set up of the kinematic ball bar to calibrate a 360° arc in the XY plane, and FIG. 5B shows a set of up the kinematic ball bar to calibrate a 360° arc in the YZ and ZX plane.

After the measurement path is planned, the appropriate CNC code is generated for the circular contouring, then it is downloaded on the CNC machine tool.

Figure 6A:
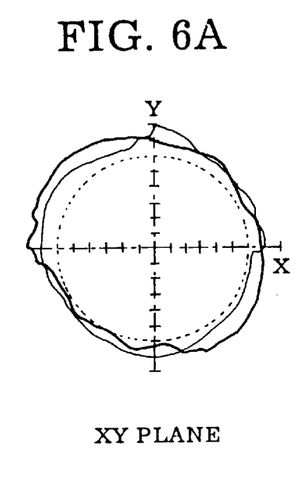
FIG. 6A to FIG. 6C are typical plots showing actually measured data using the kinematic ball bar along measurement path in each of XY,YZ,and ZX planes.
Figure 6B:
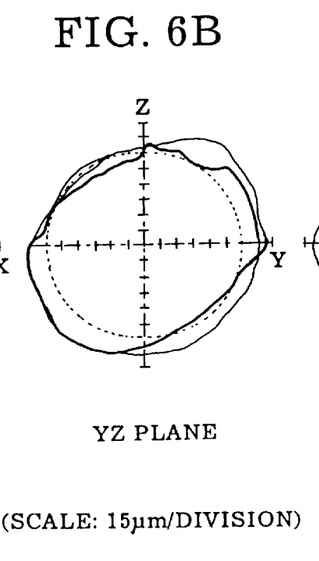
Figure 6C:
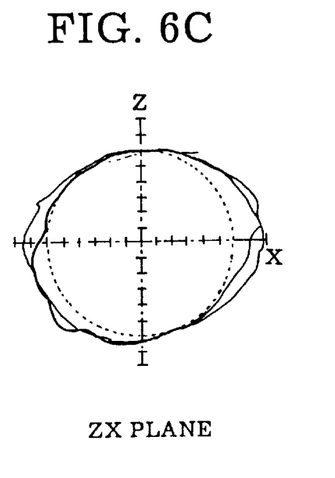

Next, step S12 is to analyze and assess each of the measured volumetric errors. Referring to FIG. 6A to FIG. 6C, FIG. 6A to FIG. 6C show the raw data plot for the circular error measurement in XY, YX, and ZX planes, respectively, where the dotted line indicates the counter clockwise contour and the solid line does the clockwise contour. As shown in FIG. 6A to FIG. 6C, there are considerable errors in measured results. However, according to the prior arts, it is difficult to individually separate each amount of the error components from the overall errors and to analyze each error component. Therefore, the error components can not be precisely removed as desired.

FIGS. 8A to 8F illustrate results of the assessment of the machine tool volumetric errors. The results are obtained by solving eq.(13) with the least squares technique. Accordingly, the raw data as plotted in FIG. 6A to FIG. 6C are analyzed by the developed system and the method according to the present invention.

Figure 7A:
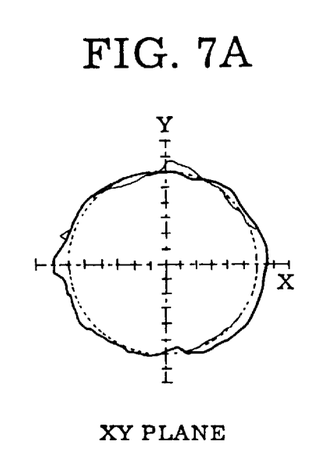
FIG. 7A to FIG. 7C are typical plots showing measured data using them kinematic ball bar along the measurement path in each of XY,YZ,and ZX planes after compensating the error components of FIGS. 8A to 8F.
Figure 7B:
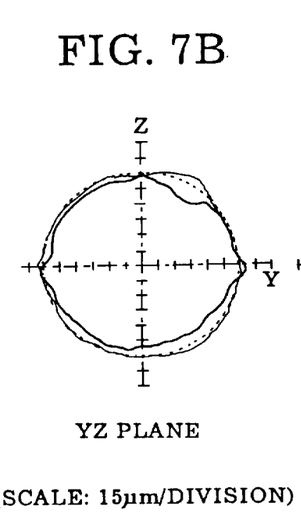
Figure 7C:
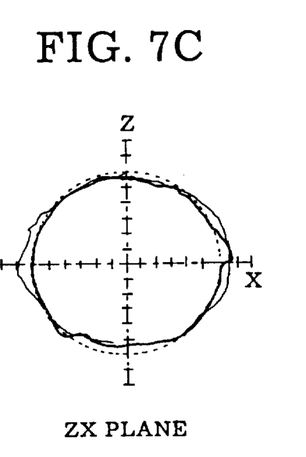
Figure 8A:
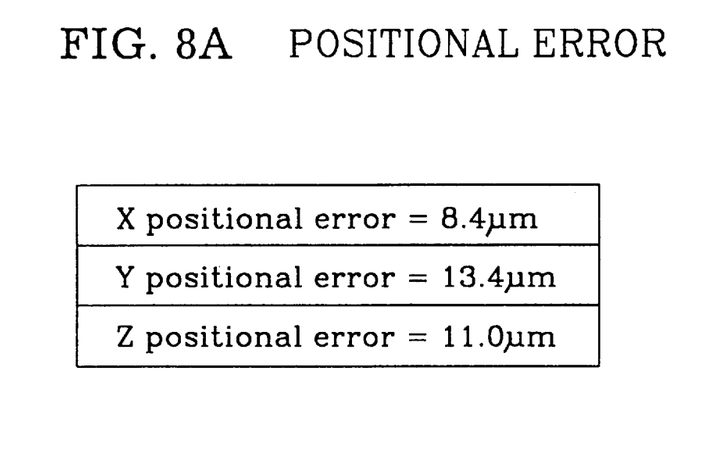
FIGS. 8A to 8F illustrate typical results of the assessment of the machine tool volumetric errors.
Figure 8B:
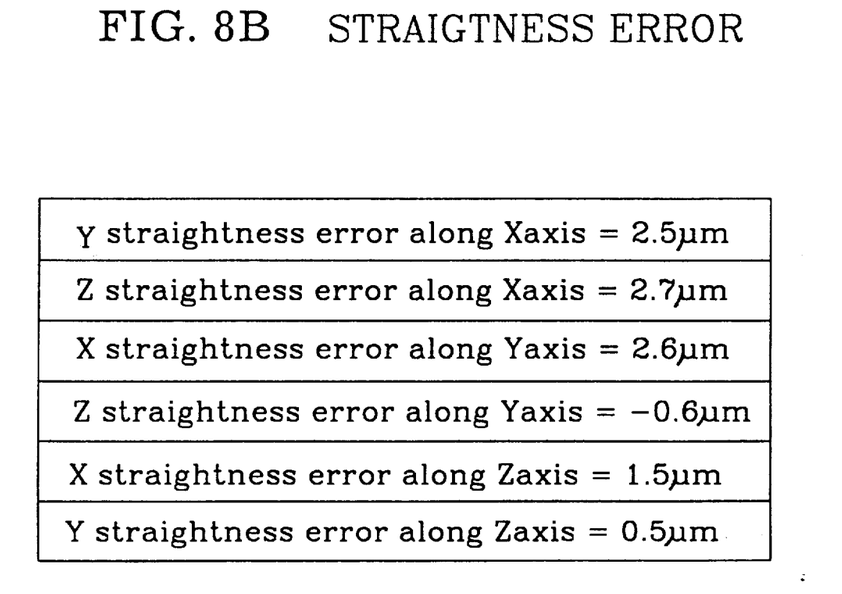
Figure 8C:
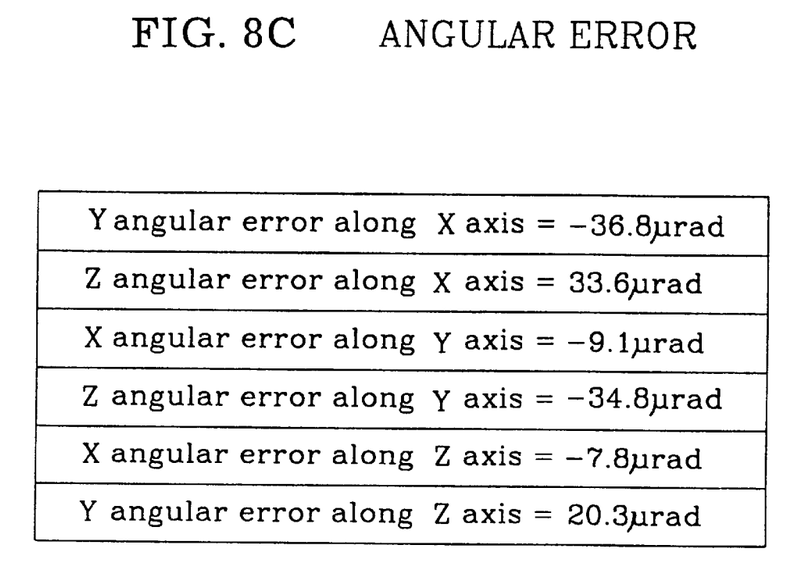
Figure 8D:
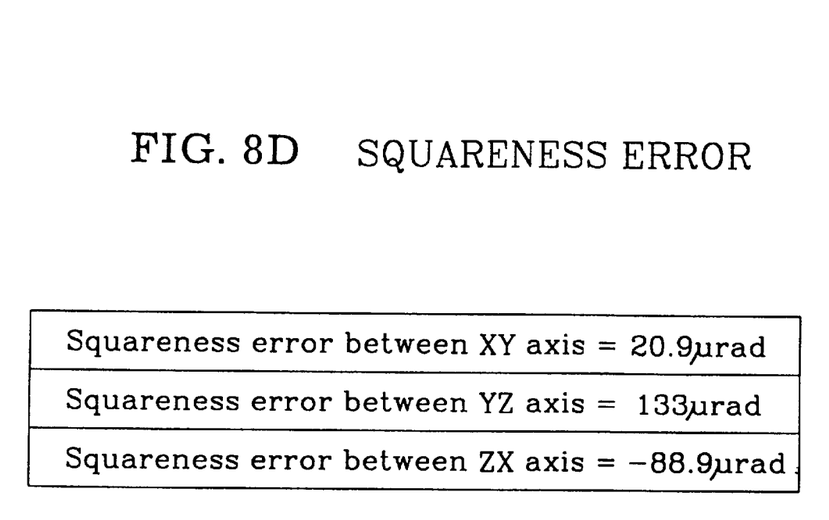
Figure 8E:
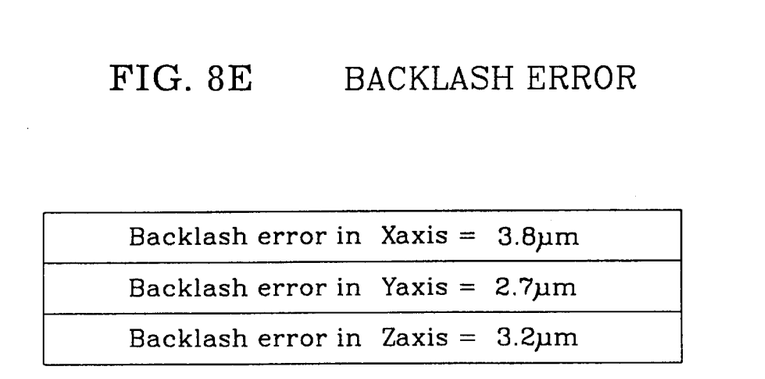
Figure 8F:
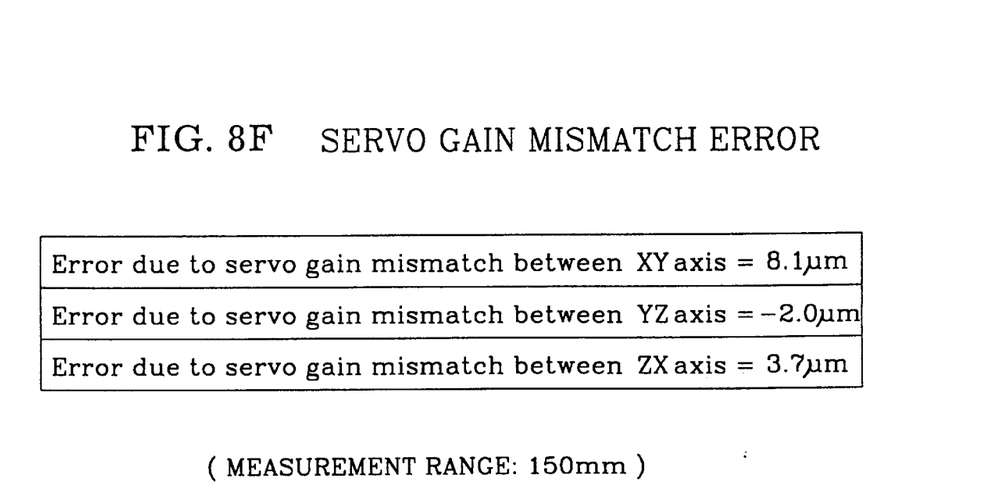

In next step S13, the analyzed error components are removed from the raw data of the circular measurement. The inputting of the volumetric errors may be performed by various techniques. The residual circular errors are calculated and then plotted. FIG. 7A to FIG. 7C show the residual circular errors after compensating the error components, giving remarkably reduced error pattern. Therefore, the developed error analysis system has been found as an efficient tool for the error diagnosis of the machine tool based on the kinematic ball bar measurement.

According to the present invention, a computer aided analysis system has been developed for the parametric error components, based on the circular error measurement using the kinematic ball bar. A new approach has been proposed and tested such that three-dimensional volumetric error model is effectively integrated for the ball bar measurement, thus the three-dimensional volumetric error components have been efficiently assessed with the ball bar measurement data. The polynominal based error modeling has been performed for the parametric error components of the machine tool. Then, the least squares technique has been applied for evaluation of the coefficients of the modeling functions. The polynominal based error modeling combined with the least squares techinique has shown good performance for the error analysis. Also, the developed system has been applied to practical cases of machine tools, and has demonstrated high efficiency for the assessment of the three-dimensional error components for machine tools in relatively short time when compared with conventional length and angle measuring equipments.

The invention is in no way limited to the embodiment described hereinabove. Various modifications of disclosed embodiment as well as other embodiments of the invention will become apparent to persons skilled in the art upon reference to the description of the invention. It is therefore contemplate that the appended claims will cover any such modification or embodiments as fall within the true scope of the invention.

What is claimed is:

1. A method of assessing three-dimensional volumetric errors in a multiaxis machine tool, comprising:

setting up a first radial error equation according to error in distance between commanded nominal coordinates of a spindle of the multiaxis machine tool and actually moved coordinates of the spindle with respect to a fixed center point to measure the volumetric errors of the multiaxis machine tool in three-dimensional working space;

modeling first positional error components along each of three orthogonal axes as a dimensionless polynomial function with corresponding positional error coefficients;

modeling second positional error components due to backlash along each of the three axes with corresponding amount of the backlash in the three axes;

modeling third positional error components along each of the three axes with corresponding amount of squareness errors between two nominally orthogonal axes among the three axes;

setting up three-dimensional volumetric error equation depending on kinematic configuration of the multiaxis machine tool;

setting up a second radial error equation by substituting the three-dimensional volumetric error equation, the first positional error components, the second positional error components, and the third positional error components for the first radial error equation;

solving the second radial error equation and calculating the positional error coefficients, the amounts of the backlash, and the amounts of squareness by means of an approximation technique and coordinates data.

2. A method as recited as claim 1 further including modeling straightness error components along each of the three orthogonal axes as a dimensionless polynomial function with second order terms and corresponding straightness error coefficients, modeling roll error components along each of the three orthogonal axes as a dimensionless polynomial function with corresponding roll error coefficients, modeling pitch and yaw error components as each derivative of the straightness error components, and modeling error components due to servo gain mismatch along each of the three orthogonal axes with each servo gain and velocity of each axis.

3. A method as recited as claim 2 further including inputting automatically measured volumetric errors into the multiaxis machine tool and compensating the volumetric errors.

4. A method as recited as claim 1, wherein a circular calibration technique which is dependent on measurement path in each of the three orthogonal planes is adapted to calculate the error coefficients and the amounts of the backlash, and the amounts of squareness.

5. A method as recited as claim 1, wherein said first positional error components are given as $$\delta x(X) = \Sigma\ dxxi(X/R)^i,$$

$$\delta y(Y) = \Sigma\ dyyi(Y/R)^i,$$

$$\delta z(Z) = \Sigma\ dzzi(Z/R)^i,$$

where $i=1\sim N$.

6. A method as recited as claim 2, wherein said straightness error components are given as $$\delta y(X) = \Sigma\ dyxi(X/R)^i,$$

$$\delta z(X) = \Sigma\ dzxi(X/R)^i,$$

$$\delta x(Y) = \Sigma\ dxyi(Y/R)^i,$$

$$\delta z(Y) = \Sigma\ dzyi(Y/R)^i,$$

$$\delta x(Z) = \Sigma\ dxzi(Z/R)^i,$$

$$\delta y(Z) = \Sigma\ dyzi(Z/R)^i,$$

where $i=2\sim N$, and wherein said roll error components are given as $$Ex(X) = \Sigma\ exxi(X/R)^i,$$

$$Ey(Y) = \Sigma\ eyyi(Y/R)^i,$$

$$Ez(Z) = \Sigma\ ezzi(Z/R)^i,$$

where $i=1\sim N$.

7. A method as recited as claim 4, wherein the measurement path is planned before calculating the error coefficients and the amounts of the backlash, and the amounts of squareness to assess the three-dimensional volumetric errors.

8. A method as recited as claim 1, wherein a kinematic ball bar is employed between the fixed center point and the spindle of the multiaxis machine tool.

* * * * *